(12) United States Patent
Chandra et al.

(10) Patent No.: US 10,395,299 B2
(45) Date of Patent: Aug. 27, 2019

(54) DYNAMIC DIGITAL SHELVES USING BIG DATA

(71) Applicant: International Business Machines Corporation, Armonk, NY (US)

(72) Inventors: Priyank Chandra, Yerawada (IN); Preetam Dey, Maharashtra (IN); William M. Duckworth, Sydney (AU); Kerrie L. Holley, Montara, CA (US); Gandhi Sivakumar, Bentleigh (AU)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1037 days.

(21) Appl. No.: 14/834,663

(22) Filed: Aug. 25, 2015

(65) Prior Publication Data

US 2017/0061519 A1    Mar. 2, 2017

(51) Int. Cl.
G06Q 30/00 (2012.01)
G06Q 30/06 (2012.01)
G06Q 10/08 (2012.01)

(52) U.S. Cl.
CPC ....... *G06Q 30/0631* (2013.01); *G06Q 10/087* (2013.01)

(58) Field of Classification Search
CPC .......................... G06Q 30/0631; G06Q 10/087
(Continued)

(56) References Cited

U.S. PATENT DOCUMENTS

2007/0083441 A1\* 4/2007 Harper .............. G06F 17/30893
705/27.1
2008/0294624 A1\* 11/2008 Kanigsberg ....... G06F 17/30867
(Continued)

FOREIGN PATENT DOCUMENTS

WO    WO2013157996 A2    10/2013

OTHER PUBLICATIONS

"Big Data Offers Big Benefits for Retailers", KDM P.O.P. Solutions Group, May 30, 2014, all pages.
(Continued)

*Primary Examiner* — Jason B Dunham
*Assistant Examiner* — Anand R Loharikar
(74) *Attorney, Agent, or Firm* — Law Offices of Ira D. Blecker, P.C.

(57) ABSTRACT

A dynamic digital shelf system includes an interface for identification of a customer: a digital shelf manager in communication with the interface to: retrieve a store's products and services available according to the store's inventory; retrieve an enriched customer profile of a customer's interests wherein the enriched customer profile is enhanced by big data; retrieve a product to product metadata map; develop a customer insights profile to weight the customer's interests with respect to the store's products and services according to the store's criteria in the product to product metadata map; identify the store's products and services matching the enriched customer profile for products and services using the customer insights profile; and output the identified store's products and services. Included is a display in communication with the digital shelf manager to display the identified products and services output from the digital shelf manager which are personalized to the customer.

20 Claims, 4 Drawing Sheets

(58) Field of Classification Search
USPC .............................................. 705/26.1–27.2
See application file for complete search history.

(56) References Cited

U.S. PATENT DOCUMENTS

| | | |
|---|---|---|
| 2012/0197729 A1 | 8/2012 | Bertram et al. |
| 2013/0198039 A1 | 8/2013 | Sridharan et al. |
| 2013/0304578 A1 | 11/2013 | Kannan et al. |

OTHER PUBLICATIONS

"Dixons trials in-store electronic shelf labels", [online], [Retrieved on Oct. 23, 2014], Retrieved from the Internet <URL: http://www.essentialretail.com/news/article/5289f9fa4fbf4-dixons-trials-in-store-electronic-shelf-labels>, all pages.

"Ensure on-shelf availability—with our mobile apps for retail store associates and managers", [online], [Retrieved on Oct. 23, 2014], Retrieved from the Internet <URL: http://www.sap.com/pc/tech/mobile/software/industry-apps/on-shelf-retail-app/index.html>, all pages.

"Super smart shelves at RBTE 2014: How to bring digital instore", HiperKinetic,Expo, Mar. 17, 2014, http://www.hiperkinetic.com/ru/blog/2014/03/17/super-smart-shelves-rbte-2014-how-bring-digital-store/#.U7uej_k72ef, all pages.

"Tata Croma, India-Centralized call center to track particular item. Customer care executive informs customer of exact store where particular piece is available when customer dials in to the call center number." [online] [Retrieved on Oct. 23, 2014], Retrieved from the Internet <URL: http://www.cromaretail.com/contact-us.aspx>, all pages.

"Tesco trialling two new in-store technologies", [online] [Retrieved on Oct. 23, 2014], Retrieved from the Internet <URL: http://www.essentialretail.com/news/article/529c6995c9d63-tesco-trialling-two-new-in-store-technologies>, all pages.

"Tesco trials electronic shelf-edge pricing in the UK", [online] [Retrieved on Oct. 23, 2014], Retrieved from the Internet <URL:http://www.retail-week.com/technology/tesco-trials-electronic-shelf-edge-pricing-in-the-uk/5055189.article>, all pages.

"Using Retail Marketing Data to Help Curb Inventory Distortion", Intel, Feb. 2013, http://www.intel.com/content/dam/www/public/us/en/documents/solution-briefs/using-retail-marketing-data-curb-inventonj-distortion-brief.pdf, all pages.

"Zibee Retail Services—Delivering Next Generation Shopping Experience", www.zigbee.org, Oct. 2013, all pages.

\* cited by examiner

DYNAMIC DIGITAL SHELVES USING BIG DATA

BACKGROUND

The present exemplary embodiments pertain to digital shelves and, more particularly, to digital shelves in a store environment which may be personalized with products and services of interest to a customer of the store.

Digital shelves are digital displays (similar to a computer screen) in a store where products and services may be displayed to customers within the store in place of, or in addition to, physical products on shelves. Present digital shelves are advantageous in that prices for products and services may be updated instantaneously. Moreover, promotions for products and services may be displayed to the customers and frequently updated to take into account market conditions.

However, digital shelves are generic and are not personalized for individuals or groups with similar interests. Further, digital shelves are static and are focused on displaying what is available in the store rather than displaying what is of interest to the customer.

In information technology, big data is a collection of data sets so large or complex that it becomes difficult to process using on-hand database management tools or traditional data processing applications. The challenges include capture, curation, storage, search, sharing, analysis, visualization and information privacy. The trend to larger data sets is due to the additional information derivable from analysis of a single large set of related data, as compared to separate smaller sets with the same total amount of data, allowing correlations to be found to spot business trends, determine quality of research, prevent diseases, link legal citations, combat crime, and determine real-time roadway traffic conditions.

While on-line commerce is now well established, and big data is beginning to become an important factor in personalizing user experiences across a range of on-line activities, the brick and mortar world remains unaware of all user information except for, perhaps during the execution of sales transactions, when stored user profiles linked to the user's identity may be used for authentication and, perhaps, to offer point of sales incentives.

Big data size is a constantly moving target and presently may extend beyond many petabytes of data. Big data is a set of techniques and technologies that require new forms of integration to uncover large hidden values from large datasets that are diverse, complex, and of a massive scale.

Big data may be characterized by the four "V"s—volume, velocity, variety and veracity.

Volume (data at scale) refers to the quantity of data that is generated. It is the size of the data which determines the value and potential of the data under consideration and whether it can actually be considered Big Data or not.

Velocity (data in motion) refers to the speed of generation of data or how fast the data is generated and processed to meet the demands and the challenges which lie ahead in the path of growth and development.

Variety (data in many forms) refers to managing many types of data and understanding and analyzing them in their native form.

Veracity (trustworthiness of data) refers to the quality of the data being captured. The veracity of data can vary greatly. Accuracy of analysis depends on the veracity of the source data. Veracity is essential for decisions.

BRIEF SUMMARY

The various advantages and purposes of the exemplary embodiments as described above and hereafter are achieved by providing, according to a first aspect of the exemplary embodiments, a dynamic digital shelf system comprising:
an interface on a computing device for identification of a customer:
a digital shelf manager on a computing device in communication with the interface to:
  retrieve a store's products and services available according to the store's inventory;
  retrieve an enriched customer profile of a customer's interests wherein the enriched customer profile is enhanced by big data;
  retrieve a product to product metadata map;
  develop a customer insights profile to weight the customer's interests with respect to the store's products and services according to the store's criteria in the product to product metadata map;
  identify the store's products and services matching the enriched customer profile for products and services using the customer insights profile; and
  output the identified store's products and services; and
a display in communication with the digital shelf manager to display the identified products and services output from the digital shelf manager, the identified products and services personalized to the customer.

According to a second aspect of the exemplary embodiments, there is provided a method for displaying products and services on a dynamic digital shelf manager, the method comprising:
responsive to customer identifying information input by a customer into the dynamic digital shelf manager, receiving the customer identifying information;
responsive to receiving by the dynamic digital shelf manager the customer identifying information:
  retrieving by the dynamic digital shelf manager a store's products and services available according to the store's inventory;
  retrieving by the dynamic digital shelf manager an enriched customer profile of the customer's interests wherein the customer profile is enhanced by big data;
  retrieving by the dynamic digital shelf manager a product to product metadata map,
  developing by the dynamic digital shelf manager a customer insights profile to weight the customer's interests with respect to the store's products and services according to the store's criteria in the product to product metadata map;
  storing the customer insights profile in the dynamic digital shelf manager;
  identifying by the dynamic digital shelf manager the store's products and services matching the enriched customer profile for products and services using the customer insights map;
  outputting by the dynamic digital shelf manager the identified store's products and services to a display of the dynamic digital shelf manager; and
  displaying on the display the identified products and services to the customer.

According to a third aspect of the exemplary embodiments, there is provided computer program product for displaying products and services on a dynamic digital shelf manager, the computer program product comprising:
a computer readable storage medium having computer readable code embodied therewith, the computer readable program code comprising:
responsive to customer identifying information input by a customer into the dynamic digital shelf manager, computer readable program code configured to receive the customer identifying information;
responsive to computer readable program code configured to receive the customer identifying information:
   computer readable program code configured to retrieve a store's products and services available according to the store's inventory;
   computer readable program code configured to retrieve an enriched customer profile of the customer's interests wherein the customer profile is enhanced by big data;
   computer readable program code configured to retrieve a product to product metadata map;
   computer readable program code configured to develop a customer insights profile to weight the customer's interests with respect to the store's products and services according to the store's criteria in the product to product metadata map;
   computer readable program code configured to store the customer insights profile;
   computer readable program code configured to identify the store's products and services matching the enriched customer profile for products and services using the customer insights map;
   computer readable program code configured to output the identified store's products and services to a display of the dynamic digital shelf manager; and computer readable program code configured to display on the display the identified products and services to the customer.

BRIEF DESCRIPTION OF SEVERAL VIEWS OF THE DRAWINGS

The features of the exemplary embodiments believed to be novel and the elements characteristic of the exemplary embodiments are set forth with particularity in the appended claims. The Figures are for illustration purposes only and are not drawn to scale. The exemplary embodiments, both as to organization and method of operation, may best be understood by reference to the detailed description which follows taken in conjunction with the accompanying drawings in which:

DETAILED DESCRIPTION

Current solutions do not provide personalized and dynamic digital shelves aligning with the individual and the groups with similar interests. The exemplary embodiments are focused on Big Data and processing the Big Data through dynamic insights more efficiently to achieve a desired outcome of targeting customers more specifically according to their needs and interest.

The exemplary embodiments may include a GUI (graphical user interface)-based apparatus which may be referred to as a "Dynamic Digital Shelf Manager using Big Data" (DDSM). DDSM may automatically or manually identify a customer and perform the following when the customer requests products or services in a store:

Execute an algorithm for identifying the products or services of possible interest to the customer by collecting data from various sources including internal data (customer's store profile) and external data (Social, Web, Mobile, Professional, Medical records, etc); the external data may be enriched with the internal data;

Perform product or service matching and display the products or services personalized to the customer through a digital interface. Augmenting with pricing/offers and other rules may also occur when the products or services are displayed; and When the customer selects the product or service, trigger the payment and delivery processes and fulfill the order.

In the following discussion, products or services may be grouped together for the purpose of discussion as just products. It should be understood that in the following discussion, references to products may include just products, just services or both products and services.

Figure 1:
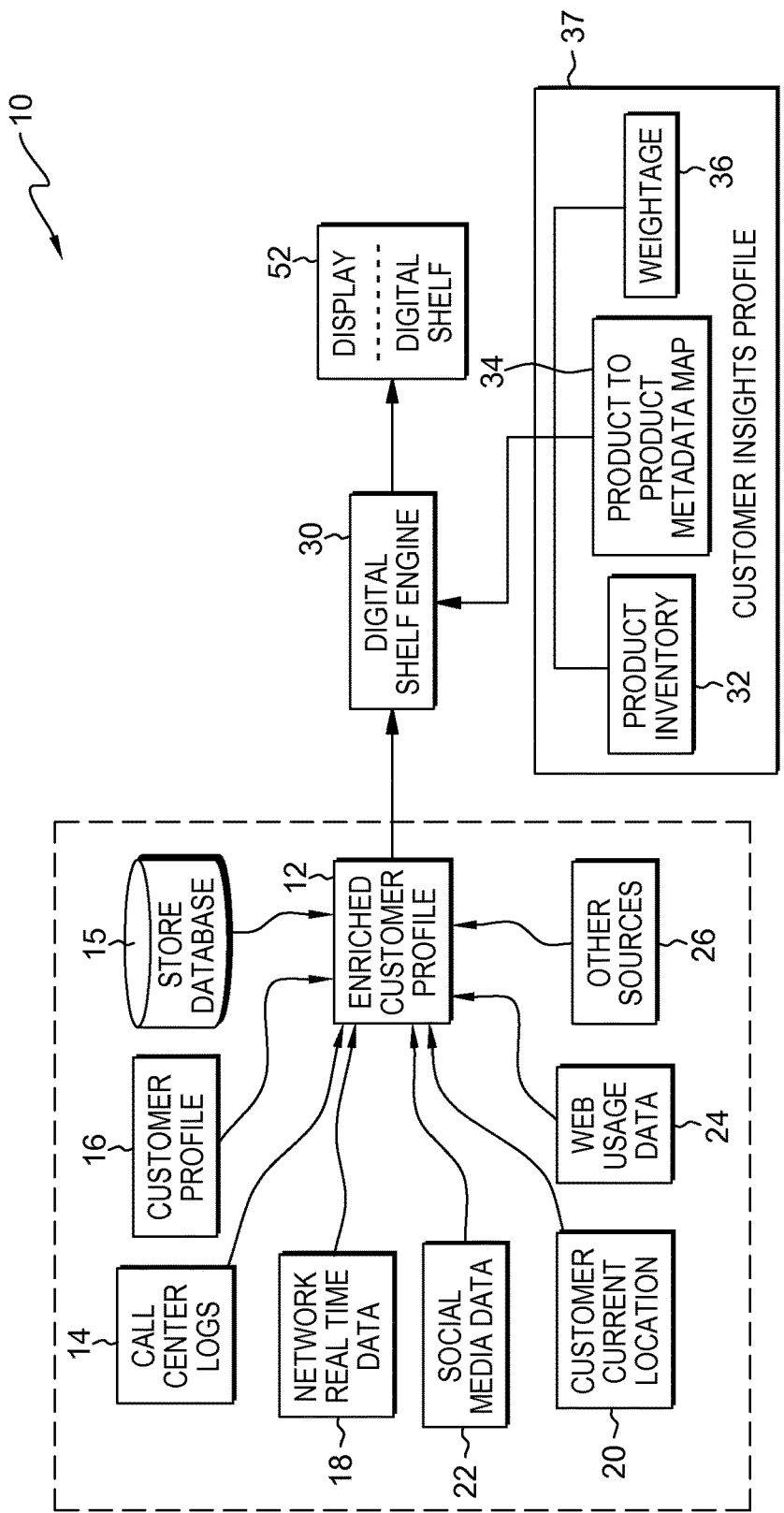
FIG. 1 illustrates the Dynamic Digital Shelf Manager using Big Data (DDSM) apparatus of the exemplary embodiments.

Referring now to the Figures in more detail, illustrated in FIG. 1 is a DDSM apparatus 10. The DDSM apparatus 10 may include an enriched customer profile 12 which may include data from various sources including but not limited to:

Internal sources including call center logs 14 and any customer profile and other profiles developed by the store and stored in the store database 15;

Customer profile 16 provided by the customer;

Network real time performance data 18 (another source of data where the performance of services is captured in real-time or otherwise);

Customer's current location 20;

Customer's social media data 22;

Customer's web usage data 24;

Customer data from other sources 26 such as public/professional data, hospital records, etc.

The enriched customer profile 12 may be stored by the store in the DDSM apparatus 10 such as in the store database 15. Alternatively, the enriched customer profile 12 may be stored on the customer's device which may be accessed by the store when the customer enters or approaches the store.

The DDSM apparatus 10 may include a digital shelf engine 30 which may be configured to execute on the store database 15 or on another computer device. The digital shelf engine 30 may receive the enriched customer profile 12. The digital shelf engine 30 may also receive the store's product inventory 32, a product to product metadata map 34 and weightage 36 applied to the metadata in the product to product metadata map 34. The combination of the store's product inventory 32, product to product metadata map 34 and weightage 36 may form the customer insights profile 37 further illustrated in FIG. 2.

Figure 2:
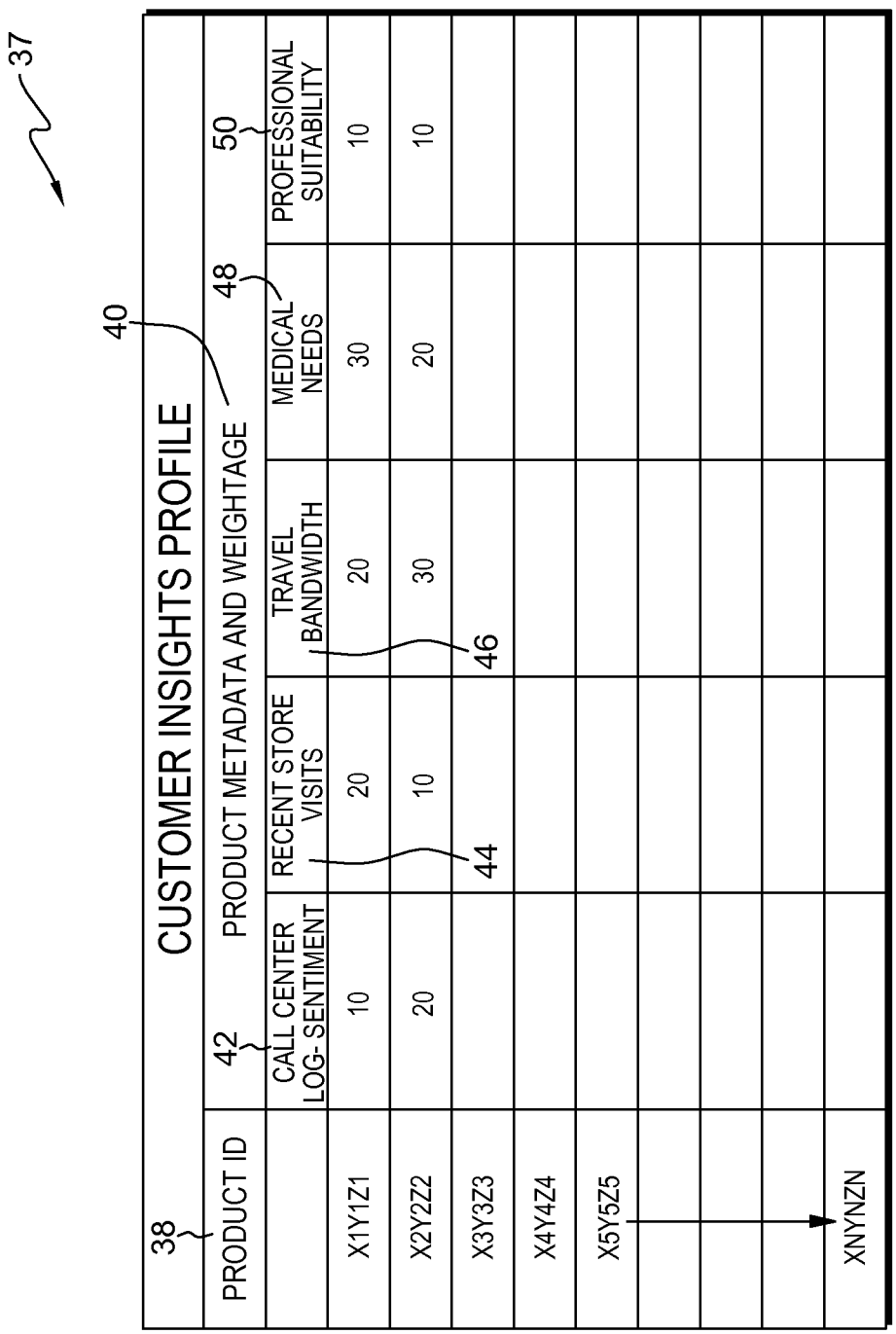
FIG. 2 illustrates a Customer Insights Profile.

Referring now to FIG. 2, for each customer there may be developed a Customer Insights Profile 37 which may help the store evaluate the veracity of the big data that pertains to the customer. An important aspect of the exemplary embodiments is evaluating the veracity of the customer's Big Data so that the store may have an accurate picture of the customer.

In the Customer Insights Profile 37, products 38, for example by product ID (identification) may be listed in one column and product metadata and weightage 40 may be listed in the remaining columns. The product metadata and weightage 40 may be further subdivided into individual categories of metadata which may be, for purposes of illustration and not limitation, call center logs 42, recent store visits 44, travel bandwidth 46, medical needs 48 and professional suitability 50. Again, these individual categories of metadata shown in FIG. 2 are arbitrary for the purpose of illustration and will change depending upon the product offerings of the store. The store may provide weightage to each combination of product and category of metadata. For example, the combination of product X1Y1Z1 and metadata category "call center log" may have a weightage of 10. The weightage scale may be chosen by the store. As shown in FIG. 2, the weightage scale may be 1 to 100. In another example, the combination of product X1Y1Z1 and metadata category "recent store visits" may have a weightage of 20.

Figure 4:
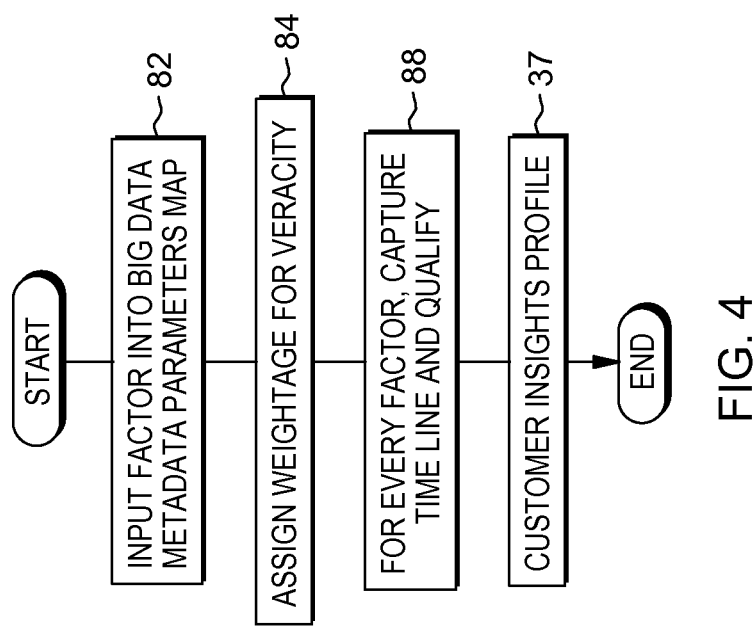
FIG. 4 is a flow chart for developing the Customer Insights Profile.

Referring now to FIG. 4, a multistep process may be followed to develop the Customer Insights Profile.

Various factors may be captured in the categories of metadata and input into a Big Data metadata parameters map, box 82, which begins the process of forming the Customer Insights Profile. For purposes of illustration and not limitation, some of these factors may include medical requirements such as the person developed vision issues or events happening in the customer's life (such as baby birth, marriage) under the Medical Needs category, travel has increased under the Travel Bandwidth category, call center behavior and interests under the Call Center Log category and profession change under the Profession Suitability category.

The veracity of the data for every category is identified and weightage assigned based upon the data source, box 84. If the metadata was based on internal call data records the weightage may be more because of the likelihood of the greater veracity of the metadata. If the metadata was captured from a completely unreliable social site, the weightage may be less because the veracity of the metadata may be less. The factor weightage may change as the customer's circumstances and social history may change. For example, recent history may show that the customer has a new baby thereby indicating a higher likelihood, and thus higher weightage, for baby products.

For each of the metadata factors the associated time line is captured and the validity of the metadata is qualified, box 88. The metadata may be qualified according to expert opinion or certain rules specified by the store. The digital shelf engine 30 may include a rules engine which may provide the metadata factors into the digital shelf engine 30 for analysis based on various inputs from product teams who will share the likelihood of the metadata factors for each of the product teams' products.

The associated time line may be captured as illustrated in the following examples. A medical requirement like a vision issue may have a longer time line, say 5 years, while a temporary disability like finger numbness may be configured to have a validity of 1 year. An event like baby birth may have a validity of 3 months.

If the validity is qualified, the factor may be picked for computation by the digital shelf engine 30. "Computation" is used in the qualitative sense in that output is arrived at based on various factors such as weightage as described previously. By qualified, in this example it is meant that the data that was captured earlier might be older when compared with the person's visit to the store. For example, the customer's internal data (as stored by the store's internal database 15) may have that the customer had a baby two years ago. There is no point in qualifying this data for a product which is meant for infants.

The result is the Customer Insights Profile 37 which may be stored by the store in the store database 15.

In a subsequent process, the Customer Insights Profile 37 is matched with the Product ID in the inventory and sequenced to identify suitable products for the customer. That is, the store's catalogue as applied to the customer may be re-aligned according to the Customer Insights Profile 37. The process may be refreshed as needed for every newly captured data.

For a Customer Insights Profile 37 that indicates that the customer has a medical requirement such as low vision that requires a phone with accessibility, the customer prefers black and the customer travels, the qualified product sequence may be, for example, a phone with auto vision adjustment, a phone with black color and/or a phone with a travel accessory package.

Referring back to FIG. 1, the Customer Insights Profile 37 (as developed in FIG. 2) is combined with the enriched customer profile 12 by the digital shelf engine 30 to result in a list of products displayed on digital shelf 52.

The DDSM apparatus 10, except for digital shelf 52, may be stored locally on the store's database 15 or may be stored remotely on a database storage unit that the store may own or have access to, such as cloud storage. The digital shelf 52 may be placed in a store at a convenient location for browsing products and services. As noted previously, the enriched customer profile 12 may also be stored by the store or may be stored on the customer's device.

Figure 3:
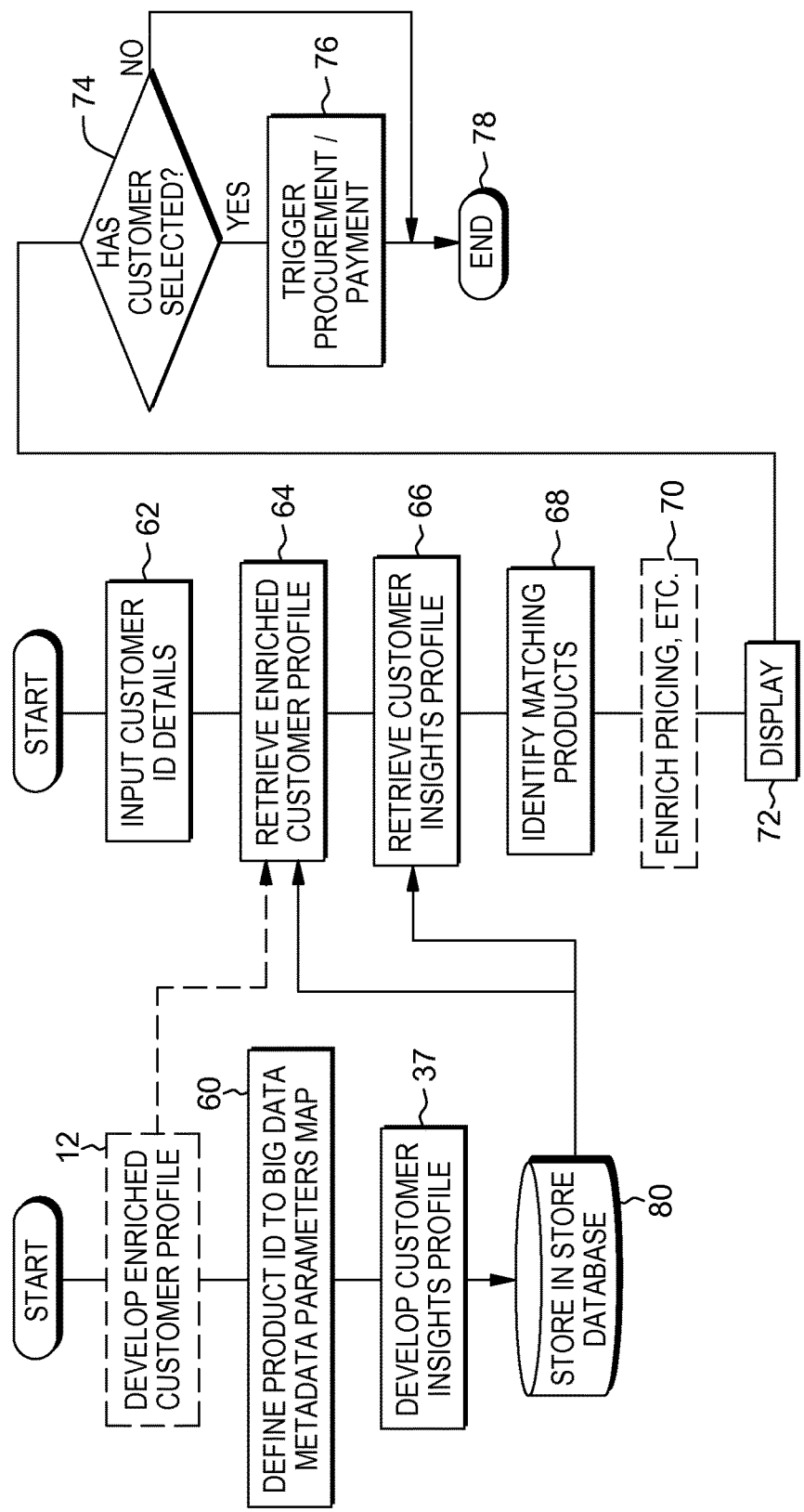
FIG. 3 is a flow chart for practicing the exemplary embodiments.

Referring now to FIG. 3, there is shown a flow chart for practicing the exemplary embodiments. On the left side of FIG. 3, an enriched customer profile 12 may be developed, box 12, by the store and stored in the store's database 15, box 80, or, as indicated by the dotted lines of box 12, the enriched customer profile 12 may be stored on the customer's device and accessed whenever the customer enters the store. The store may map each product to categories of metadata, box 60, and store it in the store's database 15. The store may also develop the Customer Insights Profile 37 illustrated in FIG. 2.

Referring now to FIG. 4, the process for developing the Customer Insights Profile 37 is illustrated. Metadata factors are input into the Big Data metadata parameters map, box 82. This Big Data metadata parameters map is shown in FIG. 2 with the metadata factors 44 to 50. Thereafter, weightage is assigned to the factors, box 84. The weightage is illustrated in FIG. 2 in the rows corresponding to Product IDs X1Y1Z1 and X2Y2Z2. For every factor, a timeline is captured and the factor is qualified, box 88. The result is the Customer Insights Profile 37.

Referring back to FIG. 3, on the right side of FIG. 3, a customer may input his identification, box 62, usually while in the store. The customer may input his identification by inputting some code such as his mobile number while near a digital shelf. Alternatively, although not as preferred, the store may have a technology such as Bluetooth to pair with the customer's mobile phone so as to identify the customer when the customer may be near the digital shelf.

In a next step, the customer's enriched profile 12 is retrieved, box 64. In one exemplary embodiment, the customer's enriched profile may be stored on the customer's mobile phone. When the customer inputs his identification, the enriched profile may be read by the digital shelf. In another exemplary embodiment, the customer's enriched profile may be stored with the DDSM apparatus 10 as described previously with respect to FIG. 1.

As described previously with respect to FIG. 2, the DDSM apparatus 10 develops a Customer Insights Profile 37 using the product to categories of metadata map, box 60, and the retrieved enriched profile, box 64. The Customer Insights Profile 37 may be retrieved from the store database by the store, box 66.

Thereafter, the store identifies matching products that are personalized to the customer, box 68.

In one exemplary embodiment, pricing and other details, such as promotional offers, may be optionally enriched, box 70. That is, knowing personal details about the customer and having the Customer Insights Profile, the store may devise pricing specifically directed to the customer to entice the customer to make a purchase. In another exemplary embodiment, enrichment of pricing and other details may not occur.

The personalized list of products may be displayed to the customer on the digital shelf, box 72.

The store may then evaluate whether the customer has selected a product for purchase, box 74. For example, the customer may input his selection of a product into the digital shelf 52. The digital shelf 52 may, for example, display a list of products and the customer may select one or more of the products by touching a screen of the digital shelf 52. Alternatively, the digital shelf 52 may have a key pad for the customer to select one of more of the products displayed. Other means for selecting one or more of the products known now or in the future may be used to select one or more of the products for purchase. If the customer has not selected a product, the process ends, box 78. If the customer has selected a product, the process proceeds to trigger procurement and payment processes, box 76, through the store's existing payment processes. Then, after payment, the process ends, box 78.

EXAMPLE

A customer enters a store looking for soccer shoes. The customer approaches a digital shelf that displays various shoes. The customer enters a code, such as the customer's mobile number to identify the customer to the digital shelf. The digital shelf communicates with the digital shelf engine to retrieve the Customer Insights Profile which has been developed using Big Data. Through the Customer Insights Profile, it is learned that the customer recently joined a soccer club. Consequently, the digital shelf 52 may display a range of soccer shoes which are personalized to the customer, including by age and gender. The customer likes what he sees, selects a pair of soccer shoes, obtains the soccer shoes (perhaps from a physical shelf near the digital shelf or from a sales clerk), pays for the soccer shoes and exits the store.

A new customer may approach the digital shelf. This time, the new customer is looking for tennis shoes and the scenario above repeats itself, providing a display of tennis shoes personalized to the interests, age and gender of the new customer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent to those skilled in the art having regard to this disclosure that other modifications of the exemplary embodiments beyond those embodiments specifically described here may be made without departing from the spirit of the invention. Accordingly, such modifications are considered within the scope of the invention as limited solely by the appended claims.

What is claimed is:

1. A dynamic digital shelf system comprising:
    an interface on a computing device for identification of a customer:
    a digital shelf manager on a computing device in communication with the interface to:
        retrieve a store's products and services available according to the store's inventory;
        retrieve an enriched customer profile of a customer's interests wherein the enriched customer profile is enhanced by big data;
        retrieve a product to product big data metadata map;
        develop a customer insights profile to weight the customer's interests with respect to the store's products and services according to the store's criteria in the product to product big data metadata map and apply weightage to product big data metadata in the product to product bib data metadata map, the weightage being determined according to the store's criteria of the veracity of the big data metadata;
        identify the store's products and services matching the enriched customer profile for products and services using the customer insights profile; and
        output the identified store's products and services; and
    a display in communication with the digital shelf manager to display the identified products and services output from the digital shelf manager, the identified products and services personalized to the customer.

2. The dynamic digital shelf system of claim 1 wherein the digital shelf manager further comprises to enrich pricing or provide product offers according to a customer's interest with respect to the store's products and services.

3. The dynamic digital shelf system of claim 1 wherein the digital shelf manager further comprises to list the store's products and services in an order according to the weight of the customer's interests.

4. The dynamic digital shelf system of claim 1 wherein the enriched customer profile includes data sources internal to the store and data sources external to the store.

5. The dynamic digital shelf system of claim 4 wherein the data sources internal to the store includes call center logs, customer profile data and a store database.

6. The dynamic digital shelf system of claim 4 wherein the data sources external to the store includes social media data, the customer's current location and web usage data by the customer.

7. The dynamic digital shelf system of claim 1 wherein the display further comprises means for the customer to select for purchase at least one of the identified products and services.

8. A method for displaying products and services on a dynamic digital shelf manager, the method comprising:
    responsive to customer identifying information input by a customer into the dynamic digital shelf manager, receiving the customer identifying information;
    responsive to receiving by the dynamic digital shelf manager the customer identifying information:
        retrieving by the dynamic digital shelf manager a store's products and services available according to the store's inventory;
        retrieving by the dynamic digital shelf manager an enriched customer profile of the customer's interests wherein the customer profile is enhanced by big data;
        retrieving by the dynamic digital shelf manager a product to product big data metadata map;
        developing by the dynamic digital shelf manager a customer insights profile to weight the customer's interests with respect to the store's products and services according to the store's criteria in the product to product big data metadata map and applying weightage to product metadata in the product to product metadata map, the weightage being determined according to the store's criteria of the veracity of the metadata;
        storing the customer insights profile in the dynamic digital shelf manager;

identifying by the dynamic digital shelf manager the store's products and services matching the enriched customer profile for products and services using the customer insights profile;

outputting by the dynamic digital shelf manager the identified store's products and services to a display of the dynamic digital shelf manager; and displaying on the display the identified products and services to the customer.

9. The method of claim 8 wherein developing the customer insights profile further comprises qualifying a validity of the big data metadata.

10. The method of claim 8 further comprising storing the customer insights profile in a store database.

11. The method of claim 8 further comprising storing the customer insights profile on a computing device of the customer.

12. The method of claim 8 further comprising enriching pricing or providing product offers according to a customer's interest with respect to the store's products and services.

13. The method of claim 8 further comprising listing the store's products and services in an order according to the weight of the customer's interests.

14. The method of claim 8 wherein the enriched customer profile includes data sources internal to the store and data sources external to the store.

15. A computer program product for displaying products and services on a dynamic digital shelf manager, the computer program product comprising:

a non-transitory computer readable storage medium having computer readable code embodied therewith, the computer readable program code comprising:

responsive to customer identifying information input by a customer into the dynamic digital shelf manager, computer readable program code configured to receive the customer identifying information;

responsive to computer readable program code configured to receive the customer identifying information:

computer readable program code configured to retrieve a store's products and services available according to the store's inventory;

computer readable program code configured to retrieve an enriched customer profile of the customer's interests wherein the customer profile is enhanced by big data;

computer readable program code configured to retrieve a product to product big data metadata map;

computer readable program code configured to develop a customer insights profile to weight the customer's interests with respect to the store's products and services according to the store's criteria in the product to product big data metadata map and apply weightage to product big data metadata in the product to product big data metadata map, the weightage being determined according to the store's criteria of the veracity of the big data metadata;

computer readable program code configured to store the customer insights profile;

computer readable program code configured to identify the store's products and services matching the enriched customer profile for products and services using the customer insights profile;

computer readable program code configured to output the identified store's products and services to a display of the dynamic digital shelf manager; and computer readable program code configured to display on the display the identified products and services to the customer.

16. The computer program product of claim 15 further comprising computer readable program code to enrich pricing or to provide product offers according to a customer's interest with respect to the store's products and services.

17. The computer program product of claim 15 further comprising computer readable program code to list the store's products and services in an order according to the weight of the customer's interests.

18. The computer program product of claim 15 wherein the enriched customer profile includes data sources internal to the store and data sources external to the store.

19. The dynamic digital shelf system of claim 1 wherein develop the customer insights profile further comprises qualify a validity of the big data metadata.

20. The computer program product of claim 15 wherein computer readable program code configured to develop the customer insights profile further comprises computer readable program code configured to qualify a validity of the big data metadata.

* * * * *